(12) United States Patent　(10) Patent No.:　　US 6,402,821 B1
Matsuyama　　　　　　　　　(45) Date of Patent:　　Jun. 11, 2002

(54) FILTER UNIT AND SOLUTION TREATMENT UNIT

(75) Inventor: Yuji Matsuyama, Kikuyo-Machi (JP)

(73) Assignee: Tokyo Electron Limited, Tokyo-To (JP)

( * ) Notice: Subject to any disclaimer, the term of this patent is extended or adjusted under 35 U.S.C. 154(b) by 0 days.

(21) Appl. No.: 09/694,981

(22) Filed: Oct. 24, 2000

Related U.S. Application Data (63) Continuation of application No. 09/135,408, filed on Aug. 18, 1998, now Pat. No. 6,165,552.

(30) Foreign Application Priority Data

Oct. 26, 1999　(JP) ............................................. 11-304362

(51) Int. Cl.[7] .............................................. B01D 19/00
(52) U.S. Cl. .............................. 96/175; 96/193; 96/219
(58) Field of Search ........................ 95/241, 247, 243, 95/266, 254, 30, 46; 96/6, 389, 155, 175, 193, 219, 191

(56) References Cited

U.S. PATENT DOCUMENTS

| | | | | |
|---|---|---|---|---|
| 3,853,500 A | * | 12/1974 | Gassmann et al. ............. | 95/30 |
| 4,935,151 A | * | 6/1990 | Do ................................. | 95/30 |
| 5,096,602 A | * | 3/1992 | Yamauchi et al. ............ | 95/241 |
| 5,425,803 A | * | 6/1995 | Van Schravendijk et al. .... | 96/6 |
| 5,792,237 A | * | 8/1998 | Hung et al. .................... | 95/241 |
| 5,803,970 A | | 9/1998 | Tateyama et al. | |
| 5,853,456 A | * | 12/1998 | Bryan et al. .................... | 95/30 |
| 5,900,045 A | * | 5/1999 | Wang et al. ................... | 95/241 |
| 5,931,349 A | * | 8/1999 | Yoo .............................. | 96/155 |
| 5,989,317 A | * | 11/1999 | Haung et al. .................. | 95/241 |
| 6,004,433 A | * | 12/1999 | Borzio et al. ................. | 95/241 |
| 6,033,475 A | * | 3/2000 | Hasebe et al. ..................... | 96/6 |
| 6,042,635 A | * | 3/2000 | Chung et al. .................. | 95/30 |
| 6,171,367 B1 | * | 1/2001 | Peng et al. ..................... | 95/46 |

FOREIGN PATENT DOCUMENTS

| | | | | |
|---|---|---|---|---|
| JP | 62-1413 | * | 1/1987 | ..................... 95/30 |
| JP | 63-178807 | * | 7/1988 | ..................... 95/30 |
| JP | 3-193106 | * | 8/1991 | ..................... 95/30 |
| JP | 2000-012449 | | 1/2000 | |
| JP | 2000-114154 | | 4/2000 | |

\* cited by examiner

*Primary Examiner*—Duane S. Smith
(74) *Attorney, Agent, or Firm*—Rader, Fishman & Grauer, PLLC (57) ABSTRACT

Nitrogen gas is blown into a developing solution tank, and a developing solution is supplied through a supply nozzle to the surface of a wafer, through a filter unit or the like, with the pressure. The filter unit has a ring-shaped flow path flowing from down upward, an impurity filter provided on the inside thereof, an exhaust passage connected to an uppermost portion of the flow path, and a bubble filter composed of, for example, a hollow fiber membrane, which is provided to block a part of the exhaust passage and has the property of transmitting gas without transmitting liquid. The dissolved nitrogen contained in the developing solution is changed to bubbles by vaporizing in the flow path, and only the bubbles can be removed from the developing solution since the aforesaid bubble filter selectively transmits these bubbles whereby the amount of the developing solution can be saved. Accordingly, it is possible to remove the bubbles contained in a treatment solution while reducing consumption of the treatment solution.

10 Claims, 7 Drawing Sheets

PRIOR ART

FILTER UNIT AND SOLUTION TREATMENT UNIT

This Application is a continuation of Ser. No. 09/135,408 filed Aug. 18, 1998 now U.S. Pat. No. 6,165,552.

BACKGROUND OF THE INVENTION

1. Field of the Invention

The present invention relates to a solution treatment unit which performs, for example, developing treatment on, for example, a substrate and a filter unit included in the solution treatment unit.

2. Description of the Related Art

A mask for forming a circuit pattern on the surface of a semiconductor wafer (described as a wafer hereinafter) is obtained by irradiating a resist face with light, an electron beam, an ion beam or the like and performing developing treatment thereon after coating the surface of the wafer with a resist. A developing step of these steps is to dissolve portions which are irradiated with light or the like, or portions which are not irradiated with the same in an exposing step, with an alkaline aqueous solution or the like, and is performed by a method shown in FIG. 10 conventionally.

Figure 10:
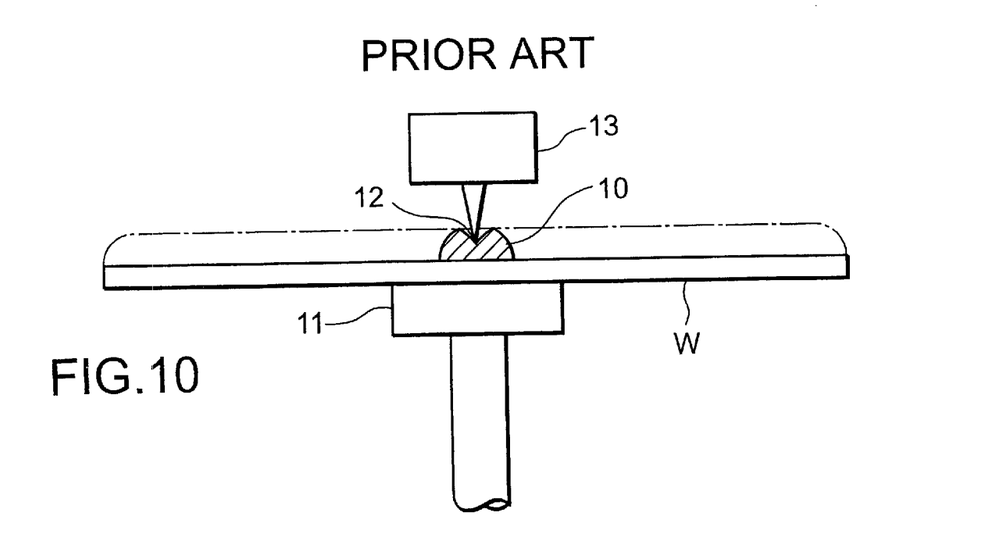
FIG. 10 is a side view showing a conventional developing unit.

Namely, in a conventional method, a wafer w is adsorbed and held on a spin chuck 11 having a function of vacuum adsorption, and a supply nozzle 13, in which a large number of discharge holes 12 are arranged over a length corresponding to a diameter of the wafer W, is positioned so that the discharge holes 12 are spaced, for example, 1 mm above the surface of the wafer W above the central portion of the wafer W. Further, a developing solution 10 is supplied through the discharge holes 12 to the central portion of the surface of the wafer W to perform coating thereof and the wafer is subsequently rotated a half turn (180 degree) while the developing solution 10 is supplied through the discharge holes 12.

Figure 11:
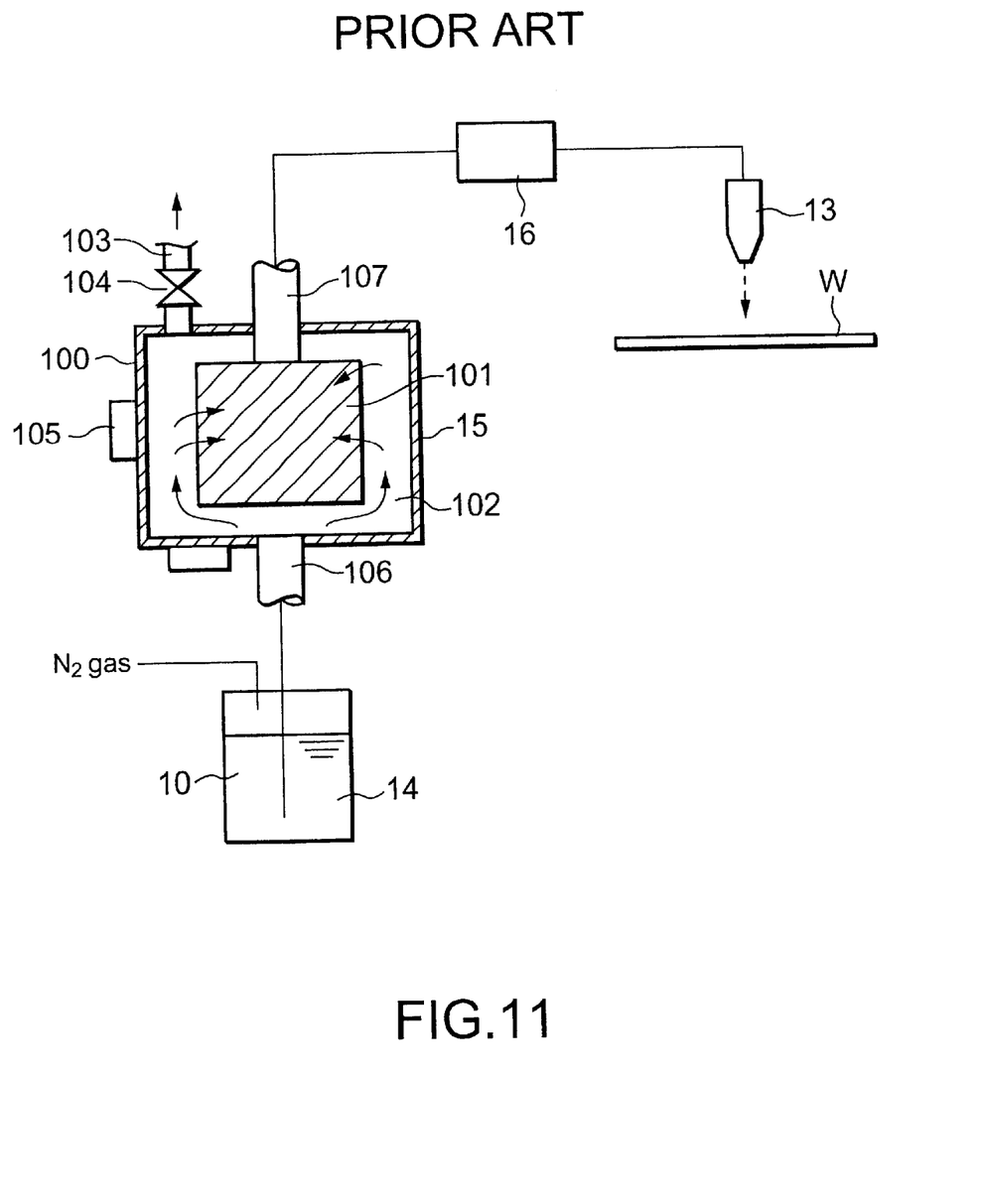
FIG. 11 is an explanatory view showing a supply system of the conventional developing unit.

In a developing system of this type, as shown in FIG. 11, nitrogen ($N_2$) gas is blown into a tank 14, and the developing solution 10 is delivered with the pressure through a filter portion 15 and a valve 16 and so on, and supplied through the supply nozzle 13 to the wafer W.

The filter portion 15 is to remove, for example, particles or the like mixing into the developing solution 10 by filtering them, and has a structure in which a filter 101 for removing the particles or the like is provided to be connected with a flow path 102 for the developing solution inside of, for example, a case 100, and further an exhaust passage 103 provided with a valve 104 is connected to the upper portion side of the flow path 102. 105 is an electrical capacitance sensor for detecting the generation of bubbles, and 106, 107 are supply flow paths for the developing solution 10.

Incidentally, the pressure is applied to the inside of the tank 14 by the $N_2$ gas as described above in this supply system of the developing solution 10, whereby the $N_2$ is dissolved in the developing solution 10 delivered with the application of pressure. Since a volume of the case 100 is larger than that of the supply flow path 106 for the developing solution 10 in the filter portion 15, the developing solution 10 is under reduced pressure when flowing from the supply flow path 106 into the case 100, and the $N_2$ dissolved in the developing solution 10 is vaporized to generate minute bubbles (micro bubbles) with the difference in pressure.

Due to such bubbles mixing into the developing solution 10, the flow amount of the developing solution 10 varies by the amount of the bubbles present therein, the filtering precision of the filter 101 deteriorates due to the bubbles adhering thereto in the filter portion 15, and an insufficient or no reaction occurs between the developing solution and a resist in portions in which the bubbles are mixing when the developing solution 10 is coated on the wafer W, thereby causing developing defects.

Conventionally, therefore, the bubbles generated in the filter portion 15 are removed together with the developing solution 10 through the exhaust passage 103 by manually opening the valve 104. The electrical capacitance sensor 105 is set to be on when the amount of the bubbles increases equal to or greater than a standard value and set to be off when the amount of the bubbles is smaller than or equal to the standard value, and the opening and closing timing of the valve 104 is performed based on the on-off signal of the sensor 105.

However, the above-described technique has disadvantages that the developing solution 10 containing the bubbles is exhausted together with the bubbles, thereby increasing the amount of the drained developing solution 10 and total consumption of the developing solution 10.

SUMMARY OF THE INVENTION

An object of the present invention is to provide a filter unit and a solution treatment unit capable of reducing consumption of a treatment solution.

To achieve this object, in a filter unit according to the present invention for removing impurities and bubbles contained in a treatment solution comprising: an impurity filter for removing the impurities; a flow path for flowing the treatment solution into the impurity filter; an exhaust passage for exhausting gas to the outside of the filter unit, which is connected to the flow path; and a bubble filter provided inside of the exhaust passage or on a connecting portion between the exhaust passage and the flow path to block the exhaust passage, the bubble filter has a function of blocking transmission of liquid and transmitting gas, whereby the bubbles are removed from the treatment solution by making the bubbles contained in the treatment solution pass through the bubble filter. In such filter unit, only the bubbles can be removed from the treatment solution, whereby the treatment solution is not drained, enabling consumption of the treatment solution to be reduced.

It is preferable now to use a hollow fiber a membrane for the bubble filter, and in this case, the bubbles can be efficiently removed since a large contact area can be secured in a small volume in the hollow fiber membrane. Additionally, it may be structured that means for generating ultrasound is provided on the outside of the flow path, and dissolved gas contained in the treatment solution is forced to vaporize to generate the bubbles by giving ultrasonic vibration to the treatment solution flowing in the flow path, which makes it possible to remove also the dissolved gas, enabling the amount of the dissolved gas contained in the treatment solution to be further reduced.

Further, the filter unit may have a structure in which the flow path is formed in a ring shape so that the treatment solution flows from down upward therein, the impurity filter is provided on the inside of the flow path, and the exhaust passage is further provided on the upper portion side of the flow path, which enables the amount of the removed bubbles to be increased. Furthermore, a pressure in the exhaust passage may be lower than that of the flow path, which makes it possible to remove not only the bubbles contained in the treatment solution but also the dissolved gas, enabling the amount of the dissolved gas contained in the treatment solution to be reduced.

The solution treatment unit incorporating such filter unit is structured so that the treatment solution removed the impurities and the bubbles therefrom in the filter unit is supplied through a supply nozzle to the surface of a substrate held substantially horizontal by a substrate holding portion to form a treatment solution film on the surface of the substrate.

Moreover, a solution treatment unit according to the present, in which bubbles contained in a treatment solution from a treatment solution tank are removed in an intermediate tank, and the treatment solution is supplied through a supply nozzle to the surface of a substrate held substantially horizontal by a substrate holding portion to form a treatment solution film on the surface of the substrate, may be structured so that the intermediate tank comprises: an exhaust passage for exhausting gas to the outside of the intermediate tank; and a bubble filter provided inside of the exhaust passage or on a connecting portion between the exhaust passage and the flow path to block the exhaust passage, and the bubble filter has a function of blocking transmission of liquid and transmitting gas, whereby the bubbles are removed from the treatment solution by making the bubbles contained in the treatment solution pass through the bubble filter. Also in this case, a reduction in consumption of the treatment solution is made possible since only the bubbles can be removed from the treatment solution. On this occasion, a developing solution is given as an example of the treatment solution.

These objects, other objects and advantages of the present invention will become readily apparent by the following description and the accompanying drawings.

BRIEF DESCRIPTION OF THE DRAWINGS

FIG. 2 are a bottom view showing an example of a supply nozzle provided in the solution treatment unit and a perspective view showing the same;

DETAILED DESCRIPTION OF THE PREFERRED EMBODIMENT

Figure 1:
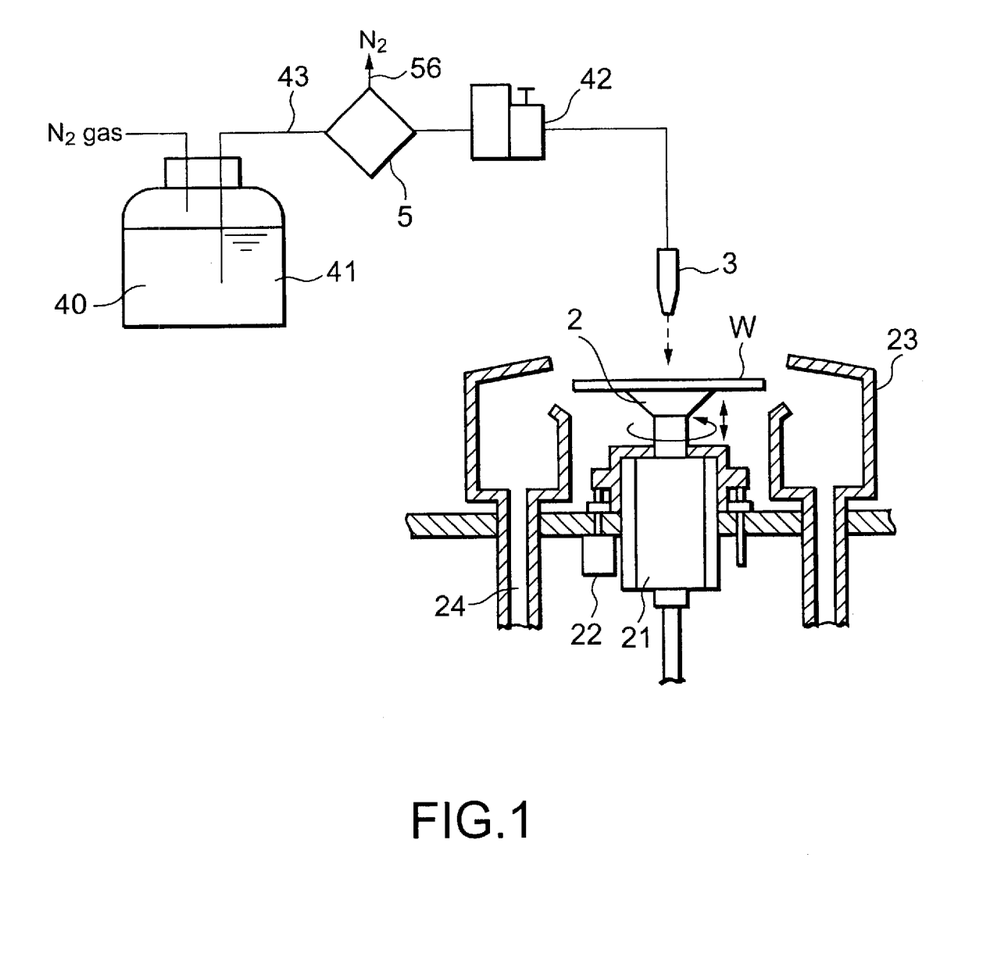
FIG. 1 is a sectional view showing an example of a solution treatment unit according to an embodiment of the present invention.

FIG. 1 is a drawing showing a structure of an embodiment in which a solution treatment unit according to the present invention is applied to a developing unit. In the drawing, 2 is a spin chuck serving as a substrate holding portion which vacuum-adsorbs a central portion of the reverse side of a wafer W forming a substrate to hold it substantially horizontal and rotates about a vertical shaft, the spin chuck being rotatable by a rotation mechanism 21 and capable of freely ascending and descending by a hoisting and lowering mechanism 22.

On the periphery of the wafer W held by the spin chuck 2, provided is a cup 23 to surround the side and the below side of the wafer W so that a washing solution and a developing solution do not spatter to the outside of the unit when the wafer W is washed, and a discharge passage 24 for absorbing and discharging the solution which flows down thereto is connected to a bottom portion of the cup 23.

Figure 2A:
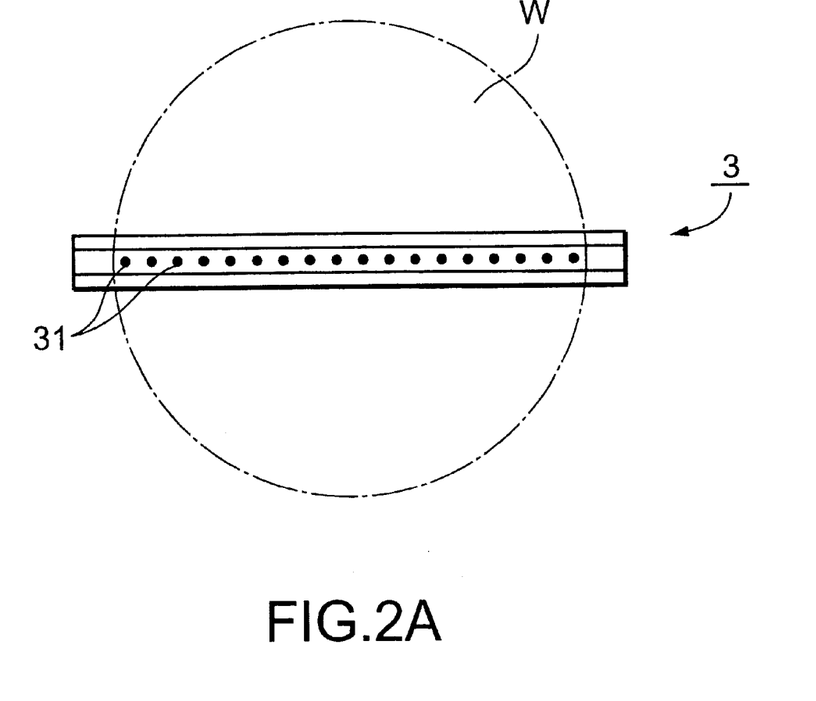

In the drawing, 3 is a supply nozzle for supplying the developing solution which is a treatment solution to the surface of the wafer W. The supply nozzle 3 is, for example as shown in FIG. 2A, provided with a large number of discharge holes 31 arranged along the wafer W over a length equal to or greater than a width of an effective region of wafer W (a device forming region).

Next, a supply system of the developing solution in the supply nozzle 3 will be explained. The supply system has a structure in which inactive gas such as, for example, $N_2$ gas is blown into a developing solution tank 41 which contains a developing solution 40 and forms a treatment solution tank, and the developing solution 40 is delivered with the gas pressure through a filter unit 5 and an air-operated valve 42 to the supply nozzle 3 to be discharged through the discharge holes 31, the developing solution tank 41, the filter unit 5, the air-operated valve 42 and the supply nozzle 3 being connected to each other through a supply flow path 43.

Figure 3:
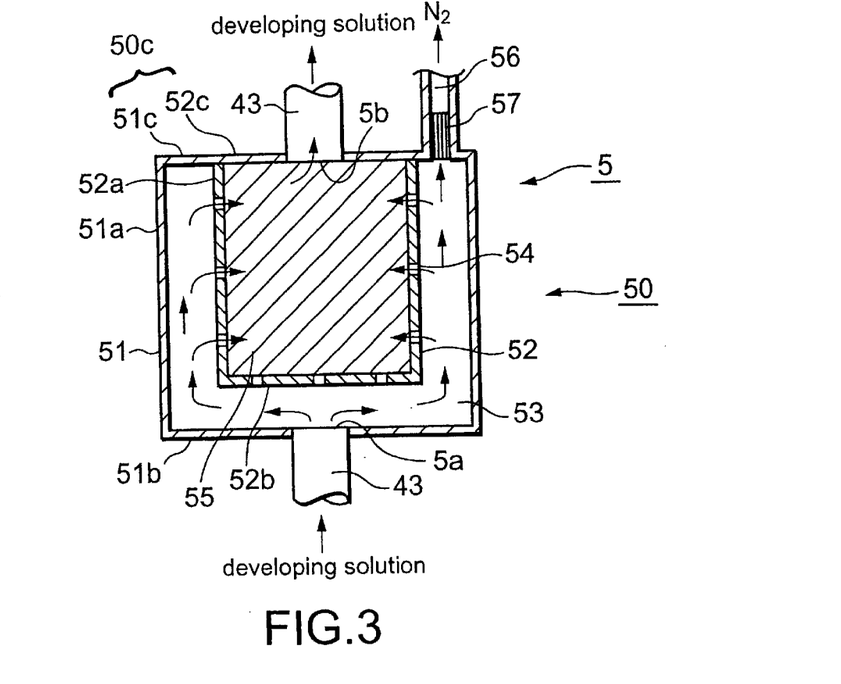
FIG. 3 is a sectional view showing an example of a filter portion provided in the solution treatment unit.

The filter 5 has a function of removing particles or bubbles such as $N_2$ gas which are impurities mixing into the developing solution 40, and the structure thereof will be illustrated hereinafter, using FIG. 3. In the drawing, 50 is a case which has a larger internal volume than the supply flow path 43 and is provided with an outer cylinder 51 and an inner cylinder 52 therein, a flow path 53 for the developing solution being formed therebetween, and the developing solution 40 flows from down upward inside of the case 50.

The outer cylinder 51 and the inner cylinder 52 are respectively formed in a cylindrical shape with both ends thereof blocked, and arranged so that respective length directions are the same as a flow direction of the developing solution 40. The inner cylinder 52 is provided inside of the outer cylinder 51 so as to form a predetermined space between sidewalls 51a (walls in the length direction) and a bottom wall 51b (a wall which blocks an opening portion of the upstream side) of the outer cylinder 51. Moreover, opening portions of the downstream side of the outer cylinder 51 and the inner cylinder 52 are blocked with an integral upper wall 50c (51c, 52c), thereby forming the ring-shaped flow path 53 for the developing solution 40 around sidewalls 52a (walls in the length direction) and a bottom wall 52b (a wall which blocks an opening portion of the upstream side) between the outer cylinder 51 and the inner cylinder 52.

On the sidewalls 52a and the bottom wall 52b of the inner cylinder 52, formed are a large number of channel holes 54 for flowing the developing solution 40 into the inside of the inner cylinder 52, and on the inside of such inner cylinder 52, provided is an impurity filter 55 which is for removing the particles and composed of, for example, polyethylene. Further, the bottom wall 51b of the outer cylinder 51 and the upper wall 52c of the inner cylinder 52 are respectively connected to the supply flow path 43, whereby the bottom wall 51b, which is a lower end of the case 50, is provided with an inlet 5a for the developing solution and the upper wall 52c, which is an upper end of the case 50, is provided an outlet 5b for the developing solution, respectively.

Furthermore, an exhaust passage 56, for discharging the bubbles such as $N_2$, for example, to the outside of the filter 5, is connected to the upper portion side (downstream side) of the flow path 53 inside of the case 50. In this example, the exhaust passage 56 is connected through the upper wall 51c of the outer cylinder 51 to the flow path 53, and on a connecting portion with the flow path 53 inside of the exhaust passage 56, provided is a bubble filter 57 for removing the bubbles mixing into the developing solution 40 to block a part of the exhaust passage 56.

Figure 4:
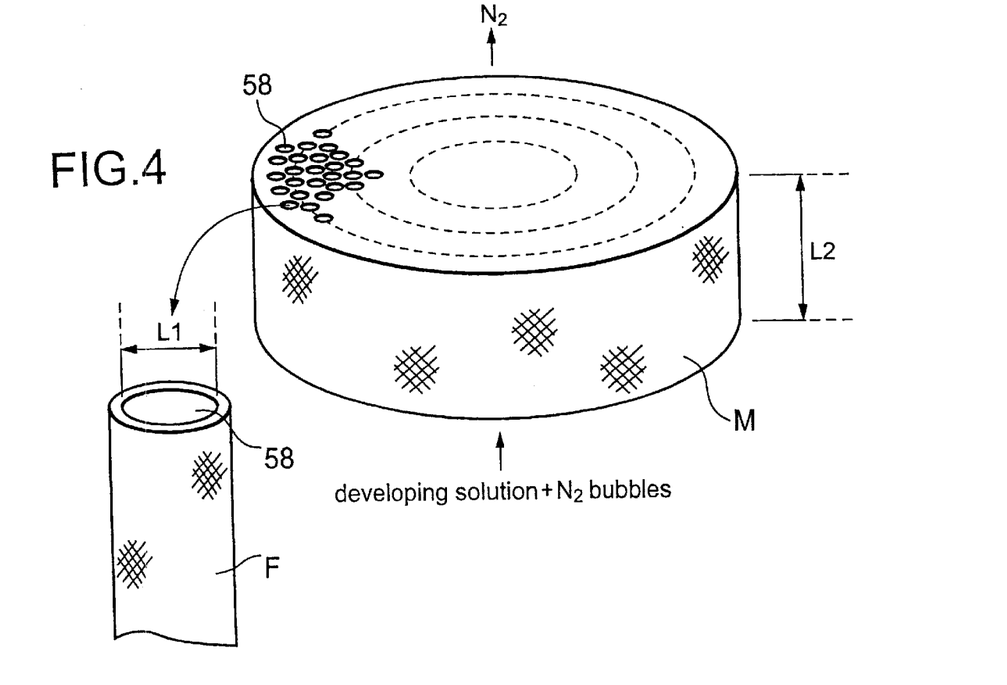
FIG. 4 is a perspective view for illustrating a hollow fiber membrane provided on the filter portion.

The bubble filter 57 has the property of transmitting only gas without transmitting liquid, and is composed of, for example, a hollow fiber membrane M. Incidentally, the hollow fiber membrane M is composed of, for example as shown in FIG. 4, bundled hollow fibers F having hollow cores and provided with a large number of hole portions 58. In this example, a hollow fiber membrane M, which is about 0.001 µm in hole diameter L1 of the hole portions 58 thereof and about 0.5 mm to 20 mm in membrane thickness L2 with synthetic polymer, for example, used as its material, is used. Such hollow fiber membrane M is arranged so that length directions of the hollow fibers F, for example, are substantially the same as the flow direction of the developing solution.

An action of the above-described embodiment will be described hereinafter. The spin chuck 2 ascends above the cup 23 and the wafer W, which has already been coated with a resist and undergone exposing treatment in a previous step, is delivered from an arm which is not shown to the spin chuck 2 to be held. Then the supply nozzle 3 is set in the above side of the central portion of the wafer W so that the discharge holes 31 are spaced, for example, about 1 mm above the surface of the wafer W.

In the supply system of the developing solution 40, the $N_2$ gas is blown into the developing solution tank 41 and the developing solution 40 containing the $N_2$ is delivered through the supply flow path 43 to the filter unit 5 with the gas pressure. In the filter unit 5, when the developing solution 40, which is supplied from the inlet 5a through the supply flow path 43 to the inside of the case 50, flows from down upward in the flow path 53 with the pressure applied by the $N_2$, a reduced pressure state occurs since the internal volume of the case 50 is larger than that of the supply flow path 43 and the flow path is rapidly enlarged around the inlet 5a, whereby the $N_2$ dissolved in the developing solution 40 is vaporized by the difference in pressure to generate bubbles.

The $N_2$ bubbles move upward, and they pass through the filter 57 to be discharged to the outside of the filter unit 5 through the exhaust passage 56 since the gas-transmittable bubble filter 57 is provided on the upper side of the filter 5. Additionally, when the flow path 53 is filled with the developing solution 40, the $N_2$ bubbles move upward the inside of the developing solution 40 and pass through the filter 57 to be discharged to the outside of the filter unit 5. At this time, although the $N_2$ bubbles are contacted with the filter 57 in a state where the developing solution 40 comes into the inside and outside of the hollow fibers F, only the $N_2$ bubbles moving upward pass through the filter 57 since the developing solution 40 can not pass through the hollow fibers F.

On the other hand, the developing solution 40, which can not pass through the filter 57, flows through the channel holes 54 of the inner cylinder 52 into the impurity filter 55 toward the side of the outlet 5b and then flows through the outlet 5b to the downstream side while being removed the particles therefrom by the contact with the filter 55.

Figure 2B:
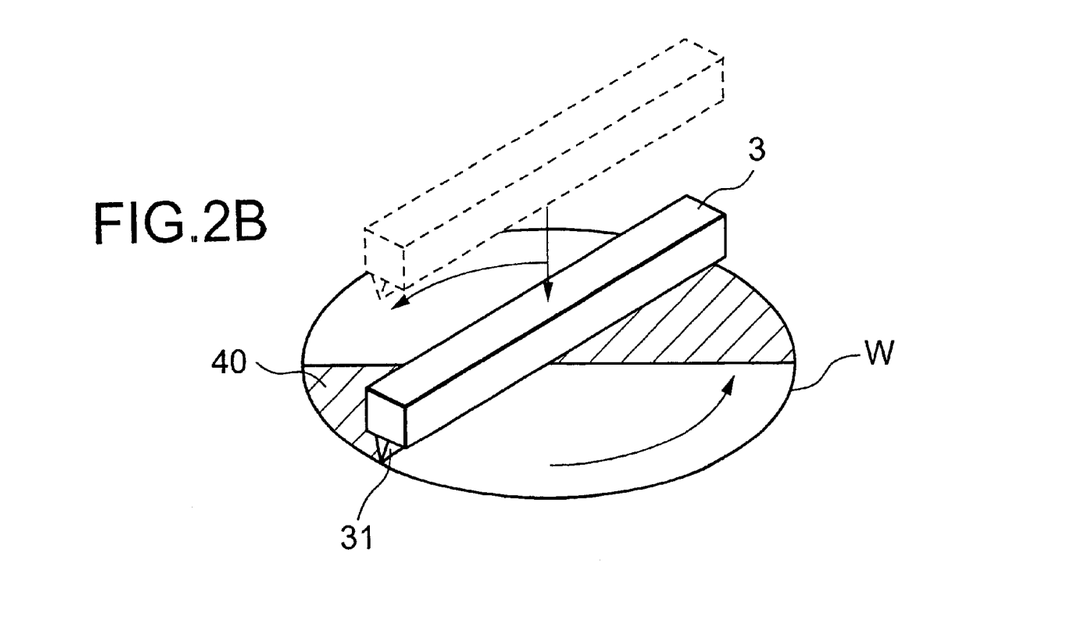

While the developing solution 40, which is cc supplied through the supply flow path 43 to the supply nozzle 3 as has been described, is supplied through the discharge holes 31 to the central portion in a diameter direction of the surface of the wafer W, the wafer W is rotated 180 degree as shown in FIG. 2B. As a result, the developing solution 40 is extended throughout the wafer W while being discharged over the diameter direction of the wafer W from the central portion thereof, to thereby complete its coating, and at the same time a film of the developing solution 40 is formed with a predetermined thickness throughout the surface of the wafer W.

After performing developing treatment on the wafer W for a predetermined time with the developing solution 40 coated thereon in this manner, the surface of the wafer is washed by discharging a washing solution, for example, pure water thereto from a washing nozzle which is not shown, and thereafter the wafer W is dried by rotating the wafer W.

Thus, the solution treatment unit according to the present invention is provided with the bubble filter 57 which transmits gas and blocks transmission of liquid on the connecting portion between the flow path 53 and the exhaust passage 56, whereby it is possible to selectively transmit the bubbles such as $N_2$ contained in the developing solution 40 by the filter 57 and remove the bubbles from the developing solution 40. As has been described, only the bubbles in the developing solution 40 can be selectively removed, which makes it possible to reduce consumption of the developing solution 40 and save the amount of the developing solution 40 compared with the conventional method in which the bubbles are removed together with the developing solution 40.

Since the hollow fiber membrane M is used as the bubble filter 57 in this case, the developing solution 40 comes into also the hole portions 58, causing a state where the developing solution 40 comes into contact with not only the outer surface of the hollow fiber membrane M but also the inner surface thereof. Accordingly, a large contact area (a membrane area) is secured in a small volume in the hollow fiber membrane M, whereby the bubbles can be efficiently removed.

Moreover, the bubbles can be removed from the developing solution 40 with the use of the upward movement of the bubbles by providing the exhaust passage 56 to be contacted with an uppermost portion of the flow path 53, and in addition the developing solution 40 flows through the impurity filter 55 and the outlet 5b into the supply flow path 43 on the downstream side after flowing to the uppermost portion of the flow path 53, whereby the bubbles can be sufficiently removed from the developing solution 40 flowing through the filter unit 5.

The bubbles can be removed from the developing solution 40 as described, thereby inhibiting the non-uniformity in developing trace widths due to a variation in the flow amount of the developing solution 40 by the amount of the bubbles present therein resulting in the difference between the amount of the developing solution 40 supplied on the wafer W and the original amount thereof. Also, the wafer W is inhibited from being contaminated due to the supply of the particles mixing into the developing solution 40 to the wafer W together with the developing solution 40 resulted from deterioration in the filtering precision of the impurity filter 55 caused by the particles adhering thereto.

Further when the bubbles generated in the filter unit 5 are not removed therein, they are intactly supplied on the wafer W through the supply flow path 43 together with the developing solution 40, or dissolved into the developing solution 40 because of the pressure reapplied thereto in the supply flow path 43, intactly discharged to the surface of the wafer and vaporized again to be bubbles (micro bubbles) with impact of the collision. When the bubbles mix into the developing solution 40 coated throughout the wafer W, the developing trace widths become non-uniform as described above. However, if the $N_2$ bubbles are generated and thereafter removed in the filter unit 5 as shown in the above example, the amount of the $N_2$ dissolved in the developing solution 40 can be reduced and the amount of the bubbles generated in later steps can be decreased, thereby increasing the uniformity of developing treatment.

Figure 5:
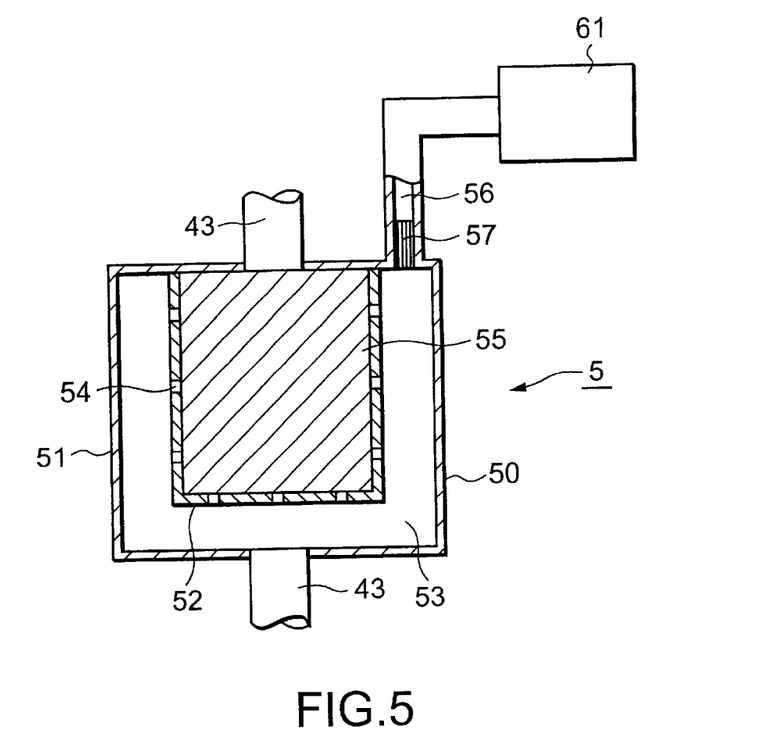
FIG. 5 is a sectional view showing another example of the filter portion.

Such developing unit may have a structure in which an exhaust pump 61 is connected to the side of the other end (the side which is not connected to the flow path 53) of the exhaust passage 56 in the filter unit 5 as shown in FIG. 5 for example, and in such structure, the pressure inside of the exhaust passage 56 is kept lower than that of the flow path 53 such as, for example, negative pressure of about 10 Pa by continuously exhausting the inside of the exhaust passage 56 by the exhaust pump 61, to perform developing treatment.

Therefore, a difference in pressure, which is corresponding to a difference between the pressure applied by the $N_2$ in the upstream side of the filter unit 5 and the negative pressure inside of the exhaust passage 56, is caused in the filter 5 and the $N_2$ bubbles are generated according to the difference in pressure, thereby increasing the amount of the bubbles generated therein compared with a case in which the inside of the exhaust passage 56 is not exhausted. As a result, the amount of the bubbles which can be removed in the filter 5 is increased, thereby reducing the amount of the $N_2$ dissolved in the developing solution 40 and making it possible to decrease the amount of the bubbles generated in the later steps.

Figure 6:
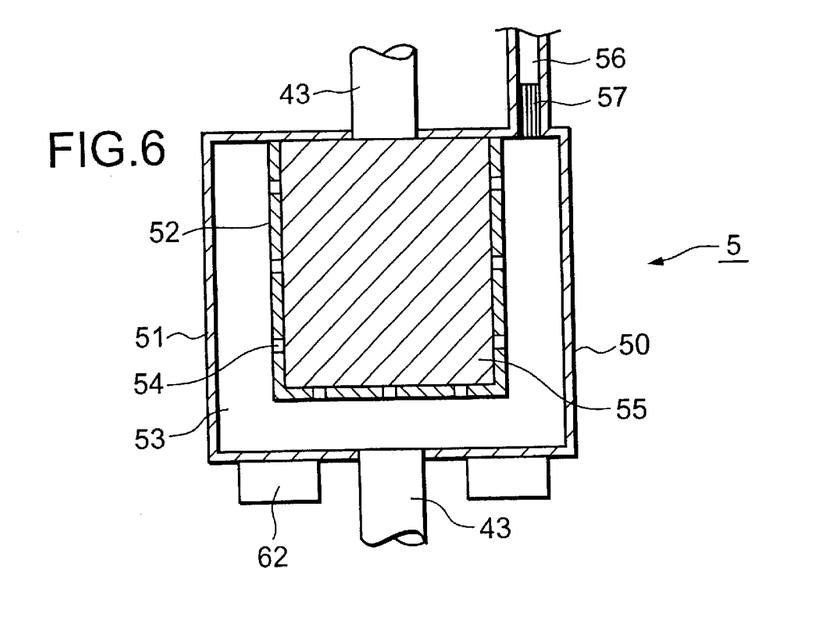
FIG. 6 is a sectional view showing further other example of the filter portion.

Another example of the present invention will be subsequently explained, using the FIG. 6. A filter unit 5 of this example is provided with, for example, piezoelectric elements 62 serving as means for generating ultrasound on a bottom wall of a case 50. Other structures are the same as those of the above-described filter 5 shown in FIG. 3.

In such structure, a developing solution 40 flows inside of a flow path 53 in which ultrasound is generated by the piezoelectric elements 62, which gives ultrasonic vibration to the developing solution 40 inside of the flow path 53, whereby $N_2$ dissolved in the developing solution 40 is forced to foam. More specifically, the $N_2$ dissolved in the developing solution 40 is vaporized by a difference in pressure, and besides the $N_2$ dissolved in the developing solution 40 is forced to foam by ultrasound in the filter 5.

As has been described, in this example, the amount of $N_2$ bubbles generated in the filter 5 is further increased resulting in an increase in the amount of the bubbles which is removed therein, whereby the amount of the $N_2$ dissolved in the developing solution 40 is further reduced, which makes it possible to decrease the amount of the bubbles generated in later steps and ensure the high uniformity in developing treatment.

Such developing unit may have a structure in which an exhaust pump which is not shown is connected to the side of the other end (the side which is not connected to the flow path 53) of an exhaust passage 56 so that the inside of the exhaust passage 56 is continuously exhausted to be kept in a negative pressure state during developing treatment as shown in the example in FIG. 5, which increases a difference in pressure in the filter 5, whereby the larger amount of the bubbles can be removed compared with a case in which the inside of the exhaust passage 56 is not exhausted as described previously.

Figure 7:
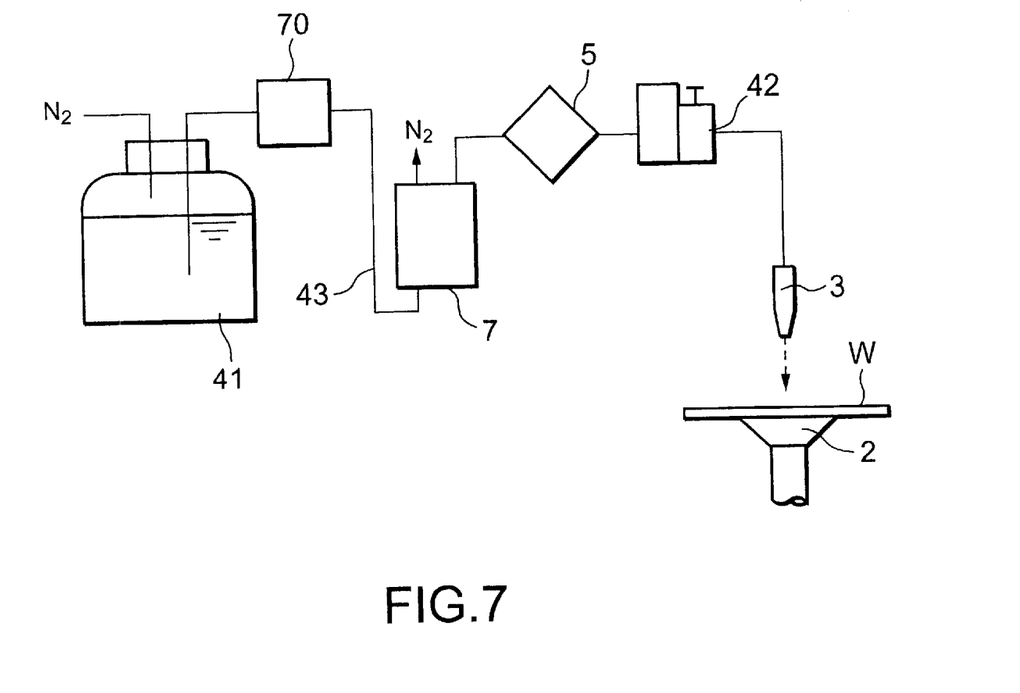
FIG. 7 is a sectional view showing another example of the solution treatment unit according to the embodiment of the present invention.

Next, the other embodiment of the present invention will be described, using FIG. 7. In this example, bubbles contained in a developing solution 40 are removed in an intermediate tank 7 in place of a filter unit 5. In a supply system of the developing solution 40 in this example, an opening and closing valve 70 formed of, for example, an air-operated valve, and the intermediate tank 7 are provided between a developing solution tank 41 containing the developing solution 40 and a filter portion 5 in that order from the upstream side.

In this example, inactive gas such as, for example, $N_2$ gas is blown into the developing solution tank 41 and the developing solution 40 is delivered through the opening and closing valve 70 to the intermediate tank 7 with the gas pressure so that the bubbles, which is generated by vaporizing $N_2$ dissolved in the developing solution 40, and bubbles of air or the like, which mix into the developing solution 40 by the opening and closing of the opening and closing valve 70, are removed in the intermediate tank 7.

Figure 8:
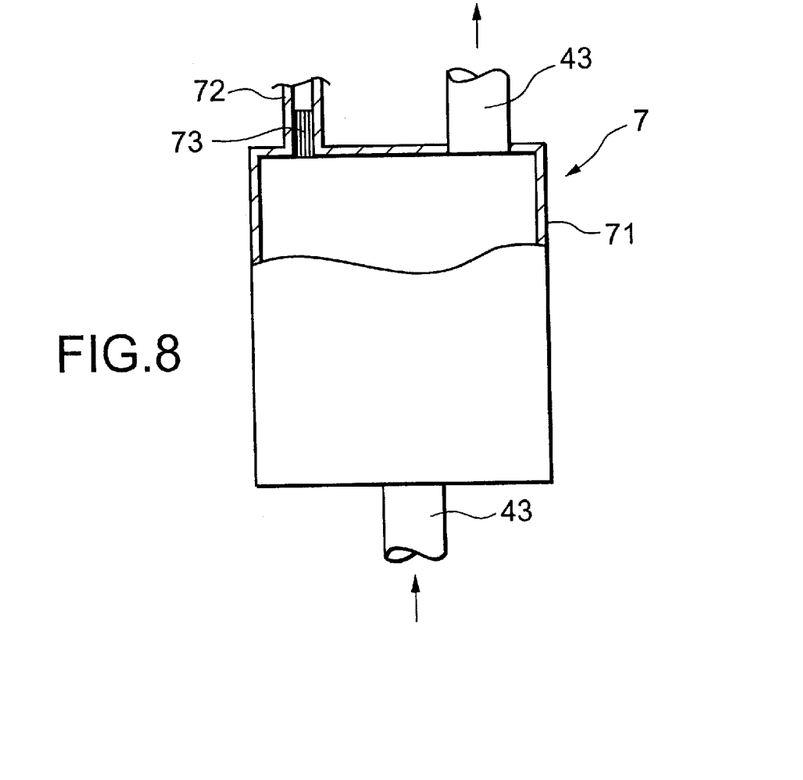
FIG. 8 is a sectional view showing an example of an intermediate tank provided in the solution treatment unit.

An example of structure of such intermediate tank 7 will be illustrated by using FIG. 8. In the drawing, 71 is a tank having a larger internal volume than a supply flow path 43, and in the tank 7 the supply flow path 43 of the upstream side is connected to a bottom portion thereof and the supply flow path 43 of the downstream side is connected to the upper portion thereof, respectively so that the developing solution 40 flows from down upward inside of the tank 71.

An exhaust passage 72 for discharging gas such as $N_2$, for example, to the outside of the intermediate tank 7 is connected to the upper portion side (downstream side) of the tank 71, and a bubble filter 73 for removing the bubbles mixing into the developing solution 40, which is composed of, for example, a hollow fiber membrane M and has the property of transmitting only gas without transmitting liquid, is provided on a connecting portion with, for example, the tank 71 inside of the exhaust passage 72, to block a part of the exhaust passage 72. Also in this example, the hollow fiber membrane M similar to that in the above example is used for the bubble filter 73, and such hollow fiber membrane M is arranged so that length directions of hole portions 58, for example, are substantially the same as the flow direction of the developing solution.

In the intermediate tank 7 like this, the developing solution 40, which is supplied through the supply flow path 43 to the inside of the tank 71, flows from down upward in a flow path 53 with the pressure applied by the $N_2$, and the gas is mixed into the developing solution 40 by the opening and closing of the opening and closing valve 70 as described above. Additionally, when the developing solution 40 is delivered through the supply flow path 43 to the tank 71, a reduced pressure state occurs in the tank 71, whereby the gas such as $N_2$ and the air dissolved in the developing solution 40 is vaporized by the difference in pressure to generate the bubbles.

Although the bubbles move upward, they pass through the filter 73 to be discharged to the outside of the intermediate tank 7 through the exhaust passage 72 since the gas-transmittable bubble filter 73 is provided on the upper side of the intermediate tank 7. Moreover, when the inside of the tank 71 is filled with the developing solution 40, the bubbles move upward inside of the developing solution 40 and pass through the filter 73 to be discharged to the outside. At this time, although the developing solution 40 is contacted with the filter 73, only the bubbles moving upward pass through the filter 73 since the developing solution 40 can not pass through the hollow fiber membrane, and the developing solution 40, which can not pass through the filter 73, flows through the supply flow path 43 of the downstream side toward the filter portion 5.

Thus, also in this example, only the bubbles can be removed from the developing solution 40, which makes it possible to save the amount of the developing solution 40 and besides reduce the amount of the gas such as $N_2$ dissolved in the developing solution 40 resulting in a decrease of the amount of the bubbles generated in the later steps.

Further, also in this example, an exhaust pump which is not shown may be connected to the side of the other end (the side which is not connected to the tank 71) of the exhaust passage 72 so that the inside of the exhaust passage 72 is continuously exhausted by the exhaust pump to be kept in a negative pressure state, or means for generating ultrasound such as piezoelectric elements may be provided on the tank 71 so as to give ultrasonic vibration to the developing solution 40 in the tank 71 to force the dissolved gas to vaporize. In these cases, the amount of the bubbles which can be removed in the intermediate tank 7 is further increased, whereby the amount of the bubbles generated in the later steps can be more decreased.

Figure 9:
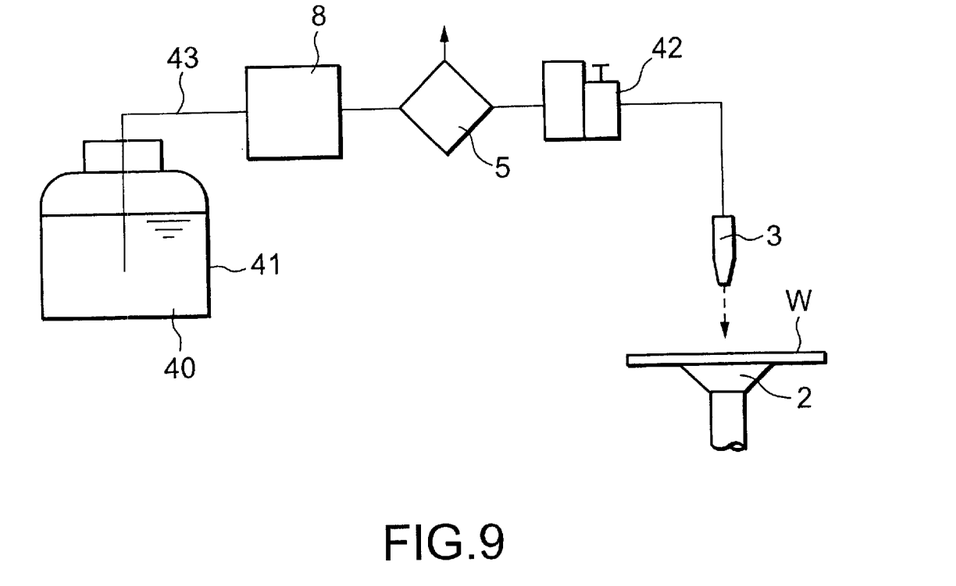
FIG. 9 is a sectional view showing further other example of the solution treatment unit according to the embodiment of the present invention.

As has been described hereinbefore, according to the present invention, the filter unit 5 and the intermediate tank 7 described above may be combined to perform removal of the gas, or either one may be employed. In addition, the developing solution 40 is delivered to the supply flow path 43 with the application of pressure by the $N_2$ blown into the developing solution tank 41 in the above example, and as shown in FIG. 9, for example, a metering pump 8 such as bellows pump, for example, may be provided between the developing solution tank 41 and the filter unit 5 so that the developing solution 40 is delivered to the filter unit 5 by the pump 8. In this case, the gas such as air is mixed into the developing solution 40 with operation of the pump 8, whereby the bubbles are removed in the filter unit 5 and the intermediate tank 7, and at this time the developing solution 40 flows from down upward with a pressure of the pump 8 inside of the filter unit 5 and the intermediate tank 7.

Moreover, the present invention is applicable to a supply system of a solvent of a resist solution, such as thinner used for resist solution coating treatment, besides the supply system of the developing solution, and the bubbles such as $N_2$ generated by a variation in volume are removed in the filter unit 5 and the intermediate tank 7 also in this case. On this occasion, types of hollow fiber membrane are appropriately selected according to types of treatment solution.

Further, according to the present invention, the hole portions 58 of hollow fiber membrane pipes formed in a tube shape in the hollow fiber membrane M may be formed into, for example, a reverse U-shape, that is, bent to be arranged so that the length directions of the hole portions 58 are substantially the same as the flow direction of the developing solution, and besides both sides of ends of the hole portions 58 are oriented toward the upstream side of the flow direction of the developing solution and bent portions of the hole portions 58 are positioned on the downstream side of the flow direction. In this case, the surface area of the hollow fiber membrane M can be further increased, and besides the developing solution comes into the inside of the hole portions 58 through the both sides of the ends thereof, whereby a contact area therebetween is increased and the bubbles can be efficiently removed.

Furthermore, according to the present invention, it is more preferable to combine with means for foaming in which a diameter of a connecting portion between the supply flow path 43 on the upstream side in the filter unit 5 and the flow path 53, and a diameter of a connecting portion between the flow path 43 on the upstream side in the intermediate tank 7 and the intermediate tank 7, are made smaller than an internal diameter of the flow path 43 so as to make the differences in pressure in these connecting portions larger thereby to increase the amount of the bubbles generated by the differences in pressure.

As has been described, according to the present invention, only the bubbles can be selectively removed from the developing solution, whereby consumption of the developing solution can be reduced. Additionally, the bubbles can be removed from the treatment solution to increase the uniformity of solution treatment according to the other examples of the present invention.

What is claimed is:

1. A filter unit for removing impurities and bubbles from a treatment solution comprising:
   a flow path for flowing said treatment solution;
   an impurity filter provided in said flow path, for removing impurities from said treatment solution;
   an exhaust passage for exhausting gas from said flow path to outside thereof, said exhaust passage connected to an adjacent part of said flow path to said impurity filter on an upper stream side of said impurity filter; and
   a bubble filter provided in an adjacent part of said exhaust passage to said flow path, for letting the gas pass therethrough and preventing the treatment solution from passing therethrough.

2. The filter unit according to claim 1, wherein said bubble filter is located so that said bubble filter keeps in contact with the treatment solution in said flow path.

3. The filter unit according to claim 1, wherein said bubble filter has a hollow fiber membrane.

4. The filter unit according to claim 1, wherein means for generating ultrasound is provided on the outside of said flow path, and the dissolved gas contained in the treatment solution is vaporized to generate bubbles by giving ultrasonic vibration to the treatment solution flowing inside of said flow path.

5. The filter unit according to claim 1, wherein said flow path is formed in a ring shape so that the treatment solution flows upwardly therein, said impurity filter is provided on the inside of said flow path, and said exhaust passage is provided on the upper portion side of said flow path.

6. The filter unit according to claim 1, further comprising a decompressing device in said exhaust passage so that a pressure in said exhaust passage is lower than that in said flow path.

7. The filter unit according to claim 1, wherein said to impurity filter, said flow path, said exhaust passage and said bubble filter are integrally provided.

8. A solution treatment unit in which a treatment solution removed impurities and bubbles therefrom in a filter unit is supplied through a supply nozzle to the surface of a substrate held substantially horizontal by a substrate holding portion to form a treatment solution film on the surface of the substrate, said filter unit comprising:

a flow path for flowing said treatment solution;

an impurity filter provided in said flow path, for removing the impurities from said treatment solution;

an exhaust passage for exhausting the gas from said flow path to outside thereof, said exhaust passage connected to an adjacent part of said flow path to said impurity filter on an upper stream side of said impurity filter; and a bubble filter provided in an adjacent part of said exhaust passage to said flow path, for letting the gas pass therethrough and preventing the treatment solution from passing therethrough.

9. The solution treatment unit according to claim 8, wherein said bubble filter has a hollow fiber membrane.

10. The solution treatment unit according to claim 8, wherein said treatment solution is a developing solution.

* * * * *

UNITED STATES PATENT AND TRADEMARK OFFICE
CERTIFICATE OF CORRECTION

PATENT NO.      : 6,402,821 B1
DATED           : June 11, 2002
INVENTOR(S)     : Yuji Matsuyama It is certified that error appears in the above-identified patent and that said Letters Patent is hereby corrected as shown below:

<u>Title page,</u>
Item [63], U.S. Application Data should be deleted.

Signed and Sealed this

Eighteenth Day of March, 2003

JAMES E. ROGAN
*Director of the United States Patent and Trademark Office*